United States Patent [19]

Hetzel

[11] 4,241,043
[45] Dec. 23, 1980

[54] METHOD FOR EVAPORATING SOLVENTS AND REACTING COMPONENTS IN COMPOUND MIXTURES

[75] Inventor: Hartmut Hetzel, Cologne, Fed. Rep. of Germany

[73] Assignee: Bayer Aktiengesellschaft, Leverkusen Bayerwerk, Fed. Rep. of Germany

[21] Appl. No.: 20,288

[22] Filed: Mar. 14, 1979

[30] Foreign Application Priority Data

Mar. 18, 1978 [DE] Fed. Rep. of Germany ....... 2811902

[51] Int. Cl.³ .................. B01J 19/00; B01D 1/22; F28D 7/04; F28D 7/10
[52] U.S. Cl. .................................. 423/659; 159/5; 159/13 A; 159/49; 165/1; 165/141; 165/163; 165/DIG. 19; 422/200; 422/202
[58] Field of Search .................. 422/200, 201, 202; 165/156, 163, 140, 141, 1, 184, DIG. 19, 133 (U.S. only); 159/5, 6 R, 13 A, 49, DIG. 2, 15; 423/659; 526/64

[56] References Cited

U.S. PATENT DOCUMENTS

| | | | |
|---|---|---|---|
| 2,278,225 | 3/1942 | Taylor | 165/140 X |
| 2,562,993 | 8/1951 | Sensel et al. | 422/202 |
| 4,119,613 | 10/1978 | Reischl et al. | 528/64 |
| 4,165,360 | 8/1979 | Casper et al. | 422/202 |

FOREIGN PATENT DOCUMENTS 797492  7/1958  United Kingdom ............. 165/183

Primary Examiner—Joseph Scovronek
Attorney, Agent, or Firm—Gene Harsh; Joseph C. Gil

[57] ABSTRACT

The invention relates to a multiple phase flow tube for evaporating and reacting components in compound mixtures in which a spiral pipe is arranged within a multiple phase flow pipe. The components are propelled by means of an internally flowing gas stream in an annular shaped passage formed by a spiral tube and a second tube arranged as a core of the spiral tube. The second tube contains a heat exchange medium. The spiral tube is arranged within a cylindrical casing which contains a heat exchange medium. A gaseous stream of a reduced amount is then sufficient for carrying out the particular chemical process desired.

3 Claims, 2 Drawing Figures

METHOD FOR EVAPORATING SOLVENTS AND REACTING COMPONENTS IN COMPOUND MIXTURES

BACKGROUND OF THE INVENTION

In commercial chemical plants, solvents frequently must be evaporated out of a compound mixture or components must be reacted. If the products are sensitive to heat and, in particular, are of high viscosity, it is difficult to obtain a high output without thermal damage to the product.

Falling film evaporators are known, in which a liquid compound mixture flows in a thin layer along the walls of vertically arranged pipes under the influence of gravity. It is difficult to distribute a mixture over pipes connected in parallel since different distributions easily lead to faults in wetting and thus to local overheating of the product. Movement within the layer of liquid is slight, so only moderate exchange of materials and heat takes place. The falling film evaporator fails at higher viscosity since gravity is no longer adequate as conveying agent.

Thin layer evaporators are also known in which a viscous liquid is distributed in a thin layer along the internal walls of a generally cylindrical body by means of rotor blades in order to carry out the processes. Due to the moving parts, the thin layer evaporator is susceptible to breakdown and demands high maintenance costs. The operating costs are also high. The heat exchange is limited as it takes place essentially only over the external walling.

A spiral tube evaporator is also used for evaporation, stripping and reacting. In this apparatus, a thin annular flow is propelled in a continuously spiral pipe by gas which comprises solvent vapors and/or other foreign gas.

The propelling force for the annular flow is proportional to the viscosity of the gas, the wetted internal surface of the pipe and the speed of the gas, and is inversely proportional to the square of the diameter of the pipe. The method is not therefore particularly effective in the case of a small concentration of volatile components without the addition of other gas. The heat exchange takes place by means of the walling and the gas, the gas only being able to exchange energy once during the entire passage. Characteristic of these coiled tubes are those described in U.S. Pat. No. 4,119,613; German Offenlegungsschriften 2,719,968; 2,719,972; 2,719,956; 2,719,967 and 2,719,969; and U.S. Pat. No 4,143,072 issued Mar. 6, 1979.

A method and an apparatus are required which allow evaporation, reaction and stripping, in particular of viscous materials, without moving components, in which a high heat exchange is ensured with at the same time, careful thermal treatment of the product and in which large product throughputs are economically processible with small amounts of gas.

DESCRIPTION OF THE INVENTION

Figure 1:
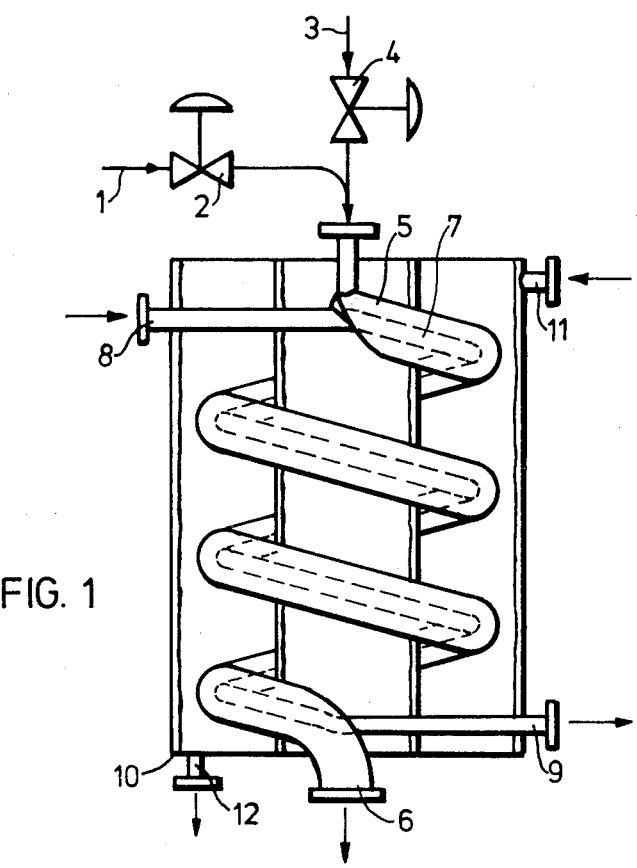
FIG. 1 shows a view of a continuously spiral shaped pipe.

These objects are achieved according to the invention in that the gas stream is guided along the path of flow in an annular shaped flow due to the arrangement of a core.

The space to be occupied by the gas stream is reduced due to the arrangement of a fixed core axially within a continuous spiral pipe so that the amount of gas present is sufficient to propel the liquid thin-layered annulr flow even in the case when small proportions are to be evaporated. At the same time, the exchange of material is intensified by friction on the surface of the liquid due to the narrow annular passage.

The possibility for excellent adaptation to the product is also an advantage. The processing conditions can be optimally designed for the respective application by the selection of the external diameter of the annular passage with regard to the exchange surfaces and by the independent selection of the internal wall clearance of the annular passage with regard to the gas available. It is also possible to allow for changes in the amount of liquid and gas, produced by evaporation, along the flow path by suitable adaptation of the abovementioned parameters so that the desirable conditions are maintained for the process. The residence time is small, in spite of intensive exchange of material. The operating costs are favorable since the evaporated gas is used as propelling agent. The process can be started up by flash distillation or by the supply of foreign gas, the foreign gas being used to assist the evaporated gas in propelling the annular flow or in changing the partial pressure during stripping.

In an embodiment of the method, heat from the annular flow and from the gas stream is exchanged intensively in the shortest path with itself and with adjacent heat carriers flowing separately in the core or in the surrounding region of the flow path.

It is known that an intensive thermal exchange with the immediately adjacent gas and via a pipe wall, with the externally flowing heat carrier occurs due to the secondary stream superimposed on the axial stream. The thermal influence of the liquid material in the cross-section of flow is substantially improved by the additional short-pathed heat exchange of the gas stream with a heat carrier flowing in the core, and this is particularly advantageous in the case of heat-sensitive products, owing to the small temperature difference allowed.

In a particular embodiment of the method, vapor of 1 to 10% by weight of the throughput is added to the annular passage.

Small quantities of solvents can be evaporated under optimum conditions due to the addition of vapor.

In an apparatus for carrying out the method, a second pipe is arranged as a core of the spiral pipe and this second pipe has an inlet flange and outlet flange for a second heat exchange medium.

The apparatus is simple in structure. In addition to the small outlay for investment, the maintenance costs are low, particularly since there are no rotating parts in the apparatus. The operating reliability is also very high.

An embodiment of the invention is illustrated in the drawings and is described in more detail below.

Figure 2:
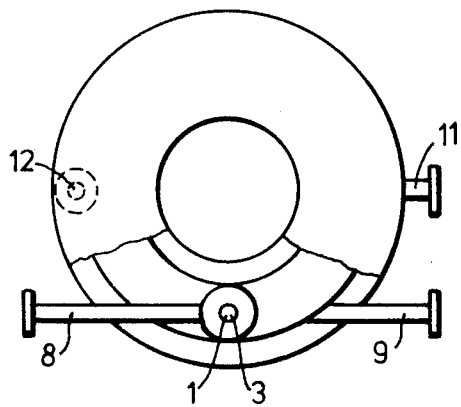
FIG. 2 shows a plan view of a continuously sprial shaped pipe.

In FIGS. 1 and 2, a solution feed pipe 1 with valve 2 merges, after joining gas pipe 3 having a valve 4, into a continuously spiral shaped pipe 5 in which the actual process takes place and which has an outlet flange 6 at its end. A pipe 7 for the heat exchange is arranged axially within the pipe 5 as a core and supports an inlet flange 8 and an outlet flange 9 at its ends. The pipe is surrounded by a closed cylindrical double casing 10 which is provided with an inlet nozzle 11 and an outlet nozzle 12.

What is claimed is:

1. In a method of evaporating solvents and reacting material components in compound mixtures in a continuous spiral tube, in which a thin-layered annular liquid flow is propelled by means of an internally flowing gas stream, the improvement wherein said tube comprises a continuous spiral tube within a cylindrical casing which has an inlet and an outlet for a heat exchange medium, characterized in that a second tube is arranged as a core of the spiral tube and has an inlet flange and an outlet flange for a second heat exchange medium, and wherein the gas stream is guided along the flow path in the annular shaped passage formed by said core and said spiral tube.

2. A method according to claim 1, characterized in that heat from the annular liquid-flow and the gas stream are intensively exchanged in the shortest path with each other and with adjacent heat carriers flowing separately in the core or in the surrounding region of the flow path.

3. A method according to claim 1, characterized in that vapor of from 1 to 10% by weight of the throughput is added to the annular passage.

* * * * *